Patented July 14, 1953

2,645,663

UNITED STATES PATENT OFFICE 2,645,663

PREPARATION OF ALKYL SUBSTITUTED AROMATIC KETONES

Lawrence W. Newton, South Charleston, W. Va., assignor to Union Carbide and Carbon Corporation, a corporation of New York No Drawing. Application April 13, 1951, Serial No. 220,989

9 Claims. (Cl. 260—591)

This application relates to the production of aromatic ketones. More particularly, it is concerned with an improved process for making aromatic ketones from alkyl substituted aromatic hydrocarbons and aromatic carboxylic acids in the presence of phosphorus oxychloride.

Acylations of aromatic hydrocarbons carried out by the well-known Friedel-Crafts reaction involve the use of an acyl chloride or carboxylic acid anhydride as a reactant together with aluminum chloride or ferric chloride as catalyst. The aluminum chloride forms a strong complex with the acid chloride and at least a molar equivalent of the former is required. Actually, however, the aluminum chloride is employed in a ratio of about 1.1 mols per mol of acid chloride. Both aluminum chloride and acyl chlorides are relatively high cost materials for the production of aromatic ketones. In addition, aluminum chloride is a corrosive, toxic, solid material which must be kept out of contact with moisture or moist air and is difficult to store and to transfer on a technical scale of operations. Anhydrous ferrous chloride is, likewise, a corrosive, toxic solid which is difficult to store and transfer on a technical scale. Usually, also, it is less efficient than aluminum chloride in Friedel-Crafts reactions, giving a higher proportion of by-products.

The present improvement is based upon my discovery that, for the production of aromatic ketones, aromatic acids can be used as the acylating agent in the presence of phosphorus oxychloride, $POCl_3$, as reactant and catalyst. The reaction can be illustrated by the following equation:

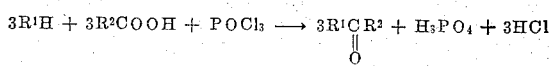

in which $R^1H$ is an alkyl substituent-containing aromatic hydrocarbon group, with $R^1$ having a molecular weight of at least 91, as, for instance, tolyl, $CH_3C_6H_4-$; xylyl, $(CH_3)_2C_6H_3-$; methylnaphthyl, $(CH_3)C_{10}H_6-$; and $R^2COOH$ is an aromatic carboxylic acid composed of carbon, oxygen, hydrogen and which is free of groups reactive with phosphorus oxychloride other than carboxyl, as for instance benzoic, toluic, naphthoic acids and the like.

Aromatic hydrocarbons lacking alkyl substituents, namely, benzene, $C_6H_6$; naphthalene $C_{10}H_8$, anthracene, $C_{14}H_{10}$ and the like, do not undergo this reaction, possibly because they are more difficult to acylate than alkyl substituted aromatic hydrocarbons.

My improved process is carried out in a manner similar to that employed for the Friedel-Crafts reaction. The aromatic hydrocarbon, the aromatic carboxylic acid and the phosphorus oxychloride in a molar ratio of about 3 to 3 to 1, respectively, by weight, are charged into a suitable reaction vessel or kettle, and heated to bring about the reaction.

Preferably, the reactants should be employed in the ratio of one-third to one-half mol of phosphorous oxychloride per mol of aromatic carboxylic acid. Larger and smaller amounts of phosphorous oxychloride can also be used, but with a ratio less than one-third mol per mol of the carboxylic acid the yields are poorer while at a ratio more than one-half mol per mol of the carboxylic acid there is no commensurate advantage gained.

At least one mol of aromatic hydrocarbon should be used per mol of the aromatic carboxylic acid to avoid waste of the more expensive reagents. Considerably larger amounts ranging from 3 to 10 and even 20 mols of hydrocarbon are useful, however, for the reason that the additional amount serves as a solvent and diluent in the reaction.

These three reactants or components of the reaction mixture are mixed, and the mixture heated gently to boiling under a reflux condenser by means of which the vapors are condensed and returned to the reaction mixture. The reaction can be carried out at temperatures ranging from room or ambient temperature up to 250° C. However, the preferred temperature is generally from about 70° to 160° C. Below 70° C. the reaction rate is quite slow in some instances, as measured by the time required for completion of the reaction. For practical purposes, the higher temperature of the preferred range usually falls near or slightly above the boiling temperature at atmospheric pressure of the hydrocarbon used as solvent or diluent in the reaction. As will be apparent, the temperature at which the mixture boils or refluxes rises during the course of the reaction, as the phosphorus oxychloride is consumed and hydrogen chloride evolved. The gaseous hydrogen chloride is removed from the reaction zone by allowing it to pass through the reflux condenser in order that the phosphorus oxychloride and other reactants are recovered and returned to the reaction mixture.

The reaction is run at atmospheric pressure preferably, although there is no disadvantage to subatmospheric or superatmospheric pressures as long as the reactants are confined to the reaction zone and the hydrogen chloride allowed to escape.

When evolution of hydrogen chloride ceases, indicating that the reaction is completed, the aromatic ketone can be recovered by any suitable means. One way of recovering the ketone is to add to the reaction mixture aqueous caustic in an amount sufficient to neutralize the phosphoric acid produced in the reaction and also any unreacted phosphorus oxychloride and aromatic carboxylic acid that may be present. The water-insoluble layer formed in this neutralization contains the aromatic ketone and the unreacted aromatic hydrocarbon. This water-insoluble layer is then separated from the aqueous layer, and the ketone obtained in a more purified form, if desired, as by distillation.

The following hydrocarbons undergo the reaction:

| | |
|---|---|
| toluene | isodurene |
| o-xylene | m-cymene |
| p-xylene | p-cymene |
| m-xylene | alpha-methyl naphthalene |
| ethyl benzene | beta-methyl naphthalene |
| mixed diethyl benzene | alpha-ethyl naphthalene |
| mesitylene | beta-ethyl naphthalene |
| pseudocumene | mixed dimethyl naphthalene |
| cumene | tetralin |
| isocumene | hydrindene |
| durene | |

The following aromatic carboxylic acids undergo the reaction:

| | |
|---|---|
| benzoic acid | m-chlorobenzoic acid |
| p-toluic acid | o-chlorobenzoic acid |
| m-toluic acid | anisic acid |
| o-toluic acid | alpha-naphthoic acid |
| p-chlorobenzoic acid | beta-naphthoic acid |

Example 1

About fifteen hundred parts of xylene (14.2 mols), 732 parts of benzoic acid (6.0 mols) and 337 parts of phosphorus oxychloride (2.2 mols) were charged into a kettle equipped with a mechanical stirrer and reflux condenser. The mixture was heated gently to its refluxing temperature and the heating continued for a period of eleven hours. During this period the temperature of the reaction mixture rose from 122° to 153° C. Hydrogen chloride was evolved during the heating, especially at the beginning.

The cooled reaction mixture was washed once with 1000 parts of water, twice with 1000 parts of aqueous sodium carbonate solutions (5 per cent) and finally with 1000 parts of water. After removal of unreacted xylene from the product at reduced pressure, there was obtained 996 parts of mixed phenyl xylyl ketone boiling between 152° C. at an absolute pressure of 4 millimeters of mercury and 159° C. at 2.6 millimeters of mercury. The refractive index ($n_D^{30}$) ranged from 1.5767 at the beginning of the cut to 1.5955 at the end. The composite product comprising the six possible isomers was a yellow oily liquid having a density $$(d_{20}^{20})$$

of 1.068 and a refractive index ($n_D^{30}$) of 1.5875. The yield was 79 per cent, based on the benzoic acid.

Example 2

About 1500 parts of toluene (16.3 mols), 732 parts of benzoic acid (6.0 mols) and 337 parts of phosphorus oxychloride (2.2 mols) were charged into a kettle and a reaction carried out according to the procedure of Example 1 with evolution of hydrogen chloride. The heating period was 19 hours during which the temperature ran to 121° C. from 110° C.

After removal of the unreacted toluene from the product at reduced pressure, there was obtained 817 parts of phenyl tolyl ketone boiling between 116° C. at an absolute pressure of 1.1 millimeters of mercury and 129° C. at 1.3 millimeters of mercury. The product comprising the isomers of phenyl tolyl ketone was an oily liquid with a density $$(d_{20}^{30})$$

of 1.079 and a refractive index ($n_D^{30}$) of 1.5965. The yield was 69.5 per cent, based on the benzoic acid.

Example 3

Following a procedure similar to that of Examples 1 and 2, benzoyl methyl naphthalene was obtained from 710 parts (5 mols) of commercial alpha-methyl naphthalene, 366 parts (3 mols) of benzoic acid and 154 parts (1 mol) of phosphorus oxychloride. The heating temperature which was 120° C. when the evolution of hydrogen chloride started was raised gradually to 152° C. over a heating period of 10.5 hours when the evolution of hydrogen chloride had almost ceased.

There was recovered from the cooled, neutralized and washed reaction mixture 441 parts of a yellow syrupy oil which boiled between 181° C. at an absolute pressure of 1.2 millimeters of mercury and 202° C. at 1.4 millimeters of mercury. The infra-red and ultra-violet absorption bands of the material were characteristic of benzoyl methyl naphthalene. The yield was 59.6 per cent, based on the benzoic acid.

What is claimed is:

1. A process for making aromatic ketones which comprises forming a mixture of phosphorus oxychloride, POCl$_3$; an alkyl-substituted aromatic hydrocarbon, R$^1$H, having a molecular weight of at least 92, and an aromatic carboxylic acid, R$^2$COOH, composed of carbon, hydrogen, and oxygen and which is free of groups reactive with phosphorus oxychloride, other than carboxyl; heating the mixture to a temperature at which hydrogen chloride is evolved therefrom to form an alkyl-substituted aromatic ketone of the general formula R$^1$COR$^2$ in which R$^1$ and R$^2$ are the radicals of the alkyl-substituted aromatic hydrocarbon and the aromatic carboxylic acid respectively; and recovering the alkyl-substituted aromatic ketone from the reaction mixture.

2. A process for making aromatic ketones which comprises forming a mixture of phosphorus oxychloride, POCl$_3$; and alkyl benzene hydrocarbon having at least one replaceable benzene hydrogen atom, and an aromatic carboxylic acid, R$^2$COOH, composed of carbon, hydrogen and oxygen and which is free of groups reactive with phosphorus oxychloride, other than carboxyl; heating the mixture to a temperature at which hydrogen chloride is evolved therefrom, to form an acylated alkyl benzene in which the acyl group is R$^2$CO— the same as the acyl group of said aromatic carboxylic acid; and recovering said acylated alkyl benzene from the reaction mixture.

3. A process for making aromatic ketones which comprises forming a mixture of phosphorus oxychloride, toluene and an aromatic carboxylic acid, R$^2$COOH, composed of carbon, hydrogen and oxygen and which is free of groups reactive with phosphorus oxychloride other than carboxyl; heating the mixture to a temperature at which hydrogen chloride is evolved therefrom to form an acylated toluene in which the acyl group is R$^2$CO, the same as the acyl group $R^2CO$ of said aromatic carboxylic acid; and recovering said acylated toluene from the reaction mixture.

4. A process for making aromatic ketones which comprises forming a mixture of phosphorus oxychloride, xylene and an aromatic carboxylic acid, $R^2COOH$, composed of carbon, hydrogen and oxygen and which is free of groups reactive with phosphorus oxychloride other than carboxyl; heating the mixture to a temperature at which hydrogen chloride is evolved therefrom to form an acylated xylene in which the acyl group is $R^2CO-$, the same as the acyl group, $R^2CO$, of said aromatic carboxylic acid; and recovering said acylated xylene from the reaction mixture.

5. A process for making aromatic ketones which comprises forming a mixture of phosphorus oxychloride, methyl naphthalene and an aromatic carboxylic acid, $R^2COOH$, composed of carbon, hydrogen and oxygen and which is free of groups reactive with phosphorus oxychloride other than carboxyl; heating the mixture to a temperature at which hydrogen chloride is evolved therefrom to form an acylated methyl naphthalene in which the acyl group is $R^2CO-$ the same as the acyl group $R^2CO$ of said aromatic carboxylic acid; and recovering said acylated methyl naphthalene from the reaction mixture.

6. A process for making aromatic ketones which comprises forming a mixture of phosphorus oxychloride, $POCl_3$; an alkyl-substituted aromatic hydrocarbon, $R^1H$, having a molecular weight of at least 92 in which $R^1$ is an alkyl-substituted aromatic hydrocarbon radical and benzoic acid; heating the mixture to a temperature at which hydrogen chloride is evolved therefrom to form a benzoylated alkyl-substituted aromatic hydrocarbon of the formula $R^1COC_6H_5$ in which $R^1$ is the same as the radical, $R^1$, of the alkyl-substituted aromatic hydrocarbon; and recovering said benzoylated aromatic hydrocarbon from the reaction mixture.

7. A process for making an aromatic ketone which comprises forming a mixture of phosphorus oxychloride, $POCl_3$, toluene and benzoic acid; heating the mixture to a temperature at which hydrogen chloride is evolved therefrom to form a tolyl phenyl ketone; and recovering said tolyl phenyl ketone from the reaction mixture.

8. A process for making an aromatic ketone which comprises forming a mixture of phosphorus oxychloride, $POCl_3$, xylene and benzoic acid; heating the mixture to a temperature at which hydrogen chloride is evolved therefrom to form a xylyl phenyl ketone; and recovering said xylyl phenyl ketone from the reaction mixture.

9. A process for making an aromatic ketone which comprises forming a mixture of phosphorus oxychloride, $POCl_3$, methyl naphthalene and benzoic acid; heating the mixture to a temperature at which hydrogen chloride is evolved therefrom to form a methylnaphthyl phenyl ketone; and recovering said methylnaphthyl phenyl ketone from the reaction mixture.

LAWRENCE W. NEWTON.

References Cited in the file of this patent

UNITED STATES PATENTS

| Number | Name | Date |
|---|---|---|
| 1,966,797 | Groggins et al. | July 17, 1934 |
| 1,995,402 | Skraup | Mar. 26, 1935 |

FOREIGN PATENTS

| Number | Country | Date |
|---|---|---|
| 281,802 | Germany | Jan. 27, 1915 |

OTHER REFERENCES

Goodall et al., J. Chem. Soc., 1936 volume, pp. 426–28.